Aug. 15, 1961  L. W. SWANSON  2,996,246
CALCULATOR
Filed Aug. 27, 1958
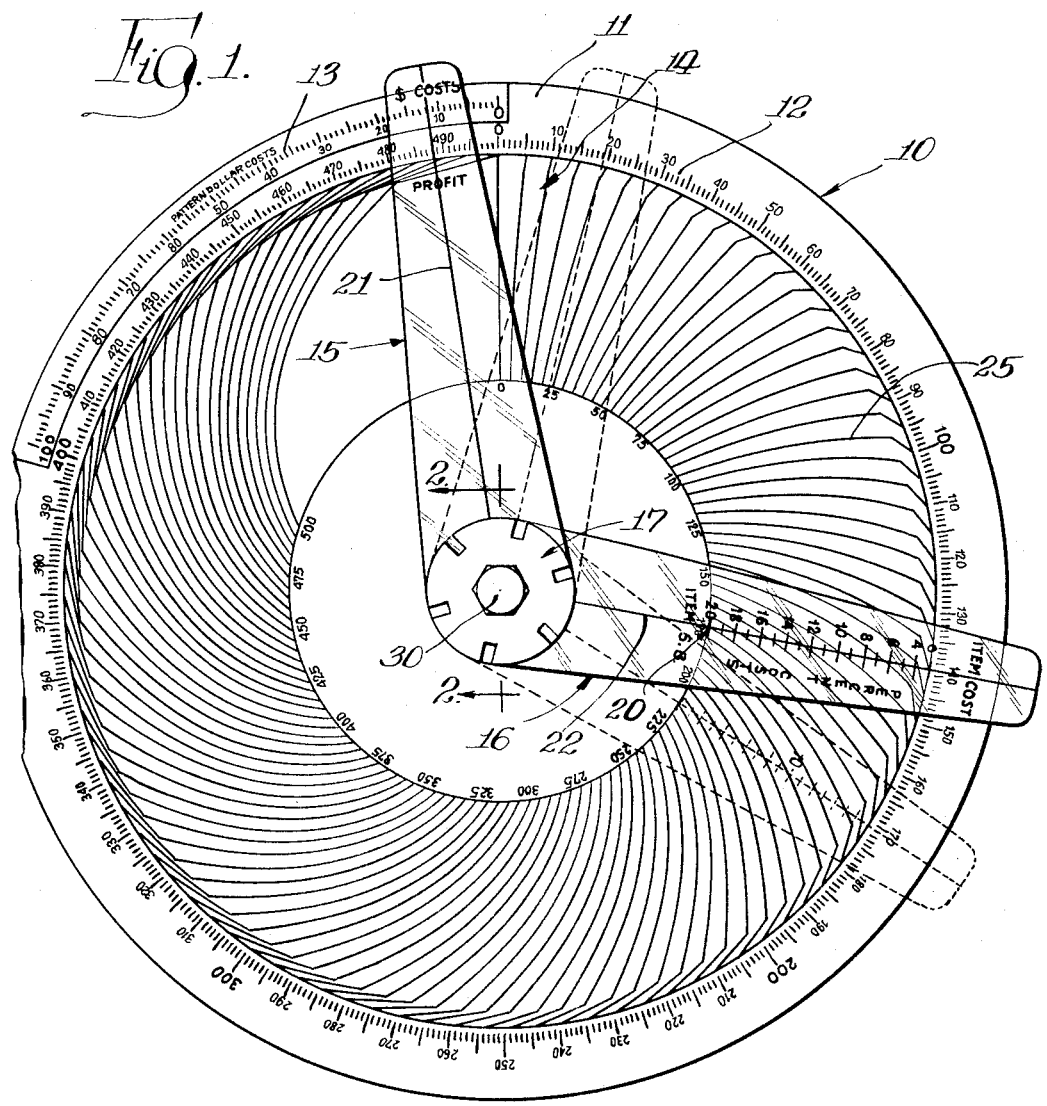
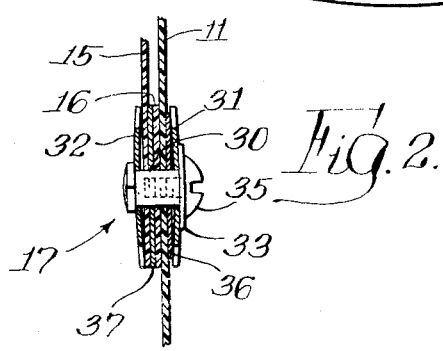
INVENTOR.
Leonard W. Swanson United States Patent Office 2,996,246
Patented Aug. 15, 1961

2,996,246
CALCULATOR
Leonard W. Swanson, Park Ridge, Ill., assignor to Arthur Andersen & Co., Chicago, Ill., a partnership
Filed Aug. 27, 1958, Ser. No. 757,549
5 Claims. (Cl. 235—83)

This invention relates in general to the field of calculators or computers and more particularly to an improved arrangement of scales and their association in a calculator for determining costs and profits in the art of merchandising.

The present invention finds a preferable embodiment in the form of a circular calculator or slide rule in which mathematical scales are ranged and related, in association with one or more movable index arms, to permit the operator to readily and accurately determine at least one unknown of a given number of mechandising cost and profit items. In greater particular, the calculator device which embodies the present invention is intended to provide a quick and convenient means of determining controllable profit for an item of merchandise, based on certain cost factors and the sale price of the merchandise. Specifically, merchandise management accounting practice has determined that the cost of sales for an item of merchandise may be resolved principally into three cost factors—namely, the purchase cost of the item; a fixed dollar cost (not influenced by the selling price) associated with procuring and selling the item; and a sliding scale or percentage cost associated with merchandising the item expressed as a percentage of the selling price. In determining controllable profit (hereinafter designated "P") of a given item of merchandise, it is necessary to subtract the cost of sales from the selling price (hereinafter designated as "S"). As above indicated, the cost of sales may be separated generally into the three above-noted cost items—purchase cost (hereinafter designated "C"); the fixed dollar cost (hereinafter designated "F"); and the percentage cost (hereinafter designated "p"). The relationship above noted may be expressed as: Controllable profit equals the selling price less the purchase cost of the item, less the fixed dollar cost, less the percentage cost of the sale price. Mathematically this becomes $P = S - C - F - pS$ (1) or $P = S - (C+F) - pS$ (2).

The slide rule of the present invention which embodies the unique and particular arrangement of scales for the above formulae is designed particularly to the successful solution and determination of factors according to this relationship. While the present computer is illustrated with restrictions to a specific range of dollars, costs, profits, and percentages costs, the principles of the invention are such that a computer device embodying the invention may be manufactured for any given range of values desired.

In mathematically solving the profit problem according to Formula 1 above, it is obviously necessary in determining controllable profit "P" from the other five factors given, to perform a multiplication and several additions and subtractions. Because of this combination of addition, subtraction, and multiplication, the arrangement of the slide rule computer to perform such functions is unique.

In brief, the present invention comprises several linear scales in which digital indexes are spaced uniformly to represent dollar values. These linear scales have a common zero index and are arranged with their pattern reading in reverse directions from such common zero index. Opposing the linear scales are a plurality of curvilinear or spiral scales which represent percentages values of the dollar values on the linear scales. A pair of index arms are workable for moving index markers thereon against the linear scales, while one of the index arms includes a plurality of uniformly spaced linear percentage index graduation for determining a given preselected range of percentage costs. By indexing the percentage scale against a given spiral curve, the corresponding percentage values of a selected linear scale value are evolved.

In a preferred embodiment of this invention, the several above-mentioned scales are arranged in a circular pattern with the movable index arms movable about a common center of rotation. Means are also provided in certain instances of operation to move both index arms simultaneously through the movement of a single one thereof. On such a circular calculator, linear dollar scales are arranged adjacent the outer periphery of a circular disc to represent the factors of selling price "S," item cost "C," fixed dollar cost "F," and profit "P" of Formula 1 above. The spiral scales, when utilized in conjunction with a linear percentage scale on one of the index arms, serve to indicate the percentage cost "$S-pS$" of Formula 1. With this arrangement, a device embodying the present invention is capable of adding and subtracting cost figures by the selected angular displacement of the two index arms, so that the angular spacing therebetween represents the sum of cost factors. Multiplication is accomplished through cooperation of the linear percentage scale on the one index arm and the spiral percentage scales.

The main object of this invention is to provide a new and improved calculator for determining controllable profit and other merchandise control factors.

Another object of this invention is to provide a new and improved arrangement of linear and curvilinear scales capable of performing addition, subtraction, and multiplication when operated in conjunction with suitable index arms on a visual computer.

Still another object of this invention is to provide a new and improved arrangement of scales and index arms, as aforesaid, for calculating controllable profit for a given item of merchandise.

A still further object of this invention is to provide a new and improved circular calculator or slide rule in which plural linear scales are arranged in a preselected manner, along with a series of curvilinear scales for operation in conjunction with plural index arms, one of which carries a linear index scale for the purpose of computing controllable profit according to merchandise management accounting practice.

The above and further objects, features, and advantages of this invention will appear to those familiar with the art from the following detailed description of a preferred form of computer which involves the inventive arrangement of scales and index devices of this invention and which is particularly illustrated in the accompanying drawings.

In the drawings:

FIGURE 1 is a plan view of a preferred form of circular computer embodying the present invention and illustrating the operation functioning of the index arms thereof; and FIGURE 2 is an enlarged partial cross-sectional view, taken substantially at line 2—2 of FIGURE 1 and viewing a clutch mechanism of the computing device.

Turning now to the drawings, a computing device, indicated generally at 10 therein, includes a circular disc 11 having a first linear scale 12 inscribed thereon in a circular pattern adjacent the outer periphery of the disc. A second linear scale 13 is disposed in opposing relationship to a portion of the first linear scale 12 to extend partially along the outer periphery of disc 11. A series of curvilinear or spiral scales 14 extend radially inwardly of the two linear scales 12 and 13, while a pair of movable index arms 15 and 16 pivot about a common center defined by a clutch mechanism 17 at the center of disc 11;

index arm 16 bearing a linear scale 20 having uniformly spaced index graduations.

The first linear scale 12, as illustrated, is graduated with a plurality of uniformly spaced index markings graduated from 0 to 500, representing dollars; the range of the scale being selected, as desired. Scale 12 values represent item cost "C," selling price "S," and profit "P," as appearing in Formula 1.

The second linear scale 13 is shown as extended only partially along the periphery of the disc 11. Scale 13, like scale 12, bears a plurality of uniformly spaced index markings, representing dollar values, and graduated from 0 to 100 in the illustrated embodiment. It will be appreciated that the zero index mark of scale 12 opposes the zero mark of scale 13, with the graduation between index markings on both of the scales being alike. It will also be appreciated that scale 13 is disposed radially outwardly of scale 12, and while the latter reads from right to left, or clockwise, on disc 11, scale 13 reads counterclockwise. The values on scale 13, therefore, read in opposite sense from the values on scale 12 and indicate the pattern or fixed dollar cost of an item "F" of Formula 1.

Since the zero index markings of both scales 12 and 13 coincide, movement of the index line 21 of index arm 15 along the scale 13 from 0 to 100 opposes like movement of the index line 22 of index arm 16 along scale 12. Thus, the angularity or the distance between the two index lines 21 and 22 of the two index arms is a measure of cumulative values. Thus movements of such arms away from each other provides an addition of dollar values, while movement of the index arms toward one another provides a subtratction of dollar values when read against the linear scales 12 and 13. In this manner, addition and subtraction functions of Formula 1, $S-C-F$, or the addition and subtraction functioning of Formula 2, $S-(C+F)$ is provided from scales 12 and 13 and the two index lines 21 and 22. In this respect, by setting the index line 22 to read item cost "C" on scale 12, while setting the index 21 to read pattern or fixed dollar cost "F" on scale 13, the angular separation of the two index lines 21 and 22 will be a measure of the item cost and pattern or fixed dollar cost $(C+F)$. This sum can then the subtracted from the selling price "S," less percentage pattern cost to determine controllable profit "P," or can be added to controllable profit "P" to determine selling price "S," less percentage pattern cost $(pS)$, as will appear presently.

The spiral scales 14 taken with the linear percentage index scale 20 on the larger index arm 16 are used to determine the selling price "S," less the percentage pattern cost, i.e., $S-pS$ of Formula 2. The spiral scales are achieved by plotting each one percent or such other interval of percentage on scale 20, as selected, against selected selling prices of scale 12. In this respect, it will be noted that the linear percentage scale 20 of index arm 16 bears a range of from 0 to 20% in the illustrated embodiment, with the particular curvilinear configuration of the spiral scales 14 being plotted for values of 4 to 20% for each $5 selling price interval on scale 12, as marked. Such partial spiral percentage curves may be selected, as illustrated, to embody a typical range of values most useful in solving a selected group of controllable profit problems. With the arrangement of the spiral and linear scales 14 and 20, as shown, following the spiral curve from a given sales price on scale 12 toward the center of the disc 11, enables the operator to determine a value on scale 12 representing selling price "S," less any percentage of the selling price selected between 4 and 20% on scale 20. For example, to find a $100 selling price, less 10% of the selling price, the intersection of the 10% mark on index scale 20 with the $100 spiral curve 25 may be found readily. Index line 22 will then read $90 on scale 12, or $(S-pS)$.

To arrive at the curvilinear configuration for the several spirals 14, a reverse of the above-indicated mathematics is utilized. For example, knowing that $100 less 10% is $90, setting the index hairline 22 at $90 on scale 12 locates a point on the $100 curve 25 at which the 10% index of scale 20 and index line 22 intersect. In this manner then, the several curves or spirals 14 are plotted.

For visual convenience, the several spiral scale lines 14 are provided at each five-dollar or five-digit intervals of the linear scale 12 in the particular embodiment illustrated. If desired, a scale 14 having a spiral curve for each digit on scale 12 could be provided and, in a like manner, the number of percentage index marks on scale 20 may be increased or decreased to represent other percentage intervals, depending on the degree of accuracy desired. If an increased number of curvilinear scales is to be employed, it is recommended that the radial dimension for disc 11 be increased sufficiently to provide convenient visual spacing between adjacent spiral curves.

As it is essential in certain operations of the improved calculator 10, as above described, that the two index arms 15 and 16 be moved together, while maintaining a set angular spacing, the clutch assembly 17, of a known and familiar construction, is employed. As seen best in FIGURE 2, clutch assembly 17 includes a central mounting bolt or hub 30 which passes through disc 11 and mounts a pair of concave-convex plate members 31 and 32 over opposite faces of the computer. One or more friction washers 33 are provided beneath the head 35 of the mounting bolt to effect a resilient system for regulating the clutch operation. Additionally, a friction clutch plate 36 is disposed between the one plate 31 and disc 11, while a second friction disc 37 is disposed between the superposed ends of the index arms 15 and 16. The entire arrangement is such that the relative frictional resistance between the two index arms and the interposed friction disc 37 is sufficiently greater than the frictional resistance between the lower disposed arm 16 and disc 11 of the calculator, that moving index arm 16 serves to drive the uppermost arm 15 therewith. Independent movement of the two arms 15 and 16 is obtained by merely holding one of the arms stationary, while the selected other index arm is moved to the desired position on scales 12 or 13.

From the foregoing, it is believed that those familiar with the art will readily recognize the operational features of the slide rule calculator 10 which embodies the improved features of this invention. In brief, to operate the calculator, the two index arms 15 and 16 are moved about their common pivot center and indexed along the two linear scales 12 and 13, while the percentage scale 20 is moved against the spiral or curvilinear scale lines 14. To better appreciate and understand the operation of the several scales as they relate to the problem of Formula 1 or 2, however, typical examples follow: (In all such examples, the pattern dollar or fixed dollar cost "F" will be $12 and the percentage cost "p" is determined at 10% of the selling price "S.")

*Problem I*

Given:
 Item cost "C"=$140
 Selling price "S"=$190
Required to find: Controllable profit "P"
 (a) Set longer index arm 16 to read item cost "C" of $140 on scale 12 (see full-line position of FIGURE 1).
 (b) Set shorter index arm 15 to read a pattern or fixed dollar cost "F" of $12 on scale 13 (see full-line position of FIGURE 1).
 (c) Move the longer arm 16 while releasing the shorter arm 15 so that the two arms move together, at a fixed angular relationship, until the 10% index of scale 20 intersects the $190 curve representing the item's selling price "S."
 (d) Read $19 profit "P" on scale 12 opposite the index line 21 of the shorter arm 15 (see dotted-line position of FIGURE 1).

Problem II

Given:
   Item cost "C"=$140
   Desirable controllable profit "P"=$19
Required to find: Selling price "S"
   (a) Set the longer index arm to read item cost "C" of $140 on scale 12.
   (b) Set shorter index arm 15 to read pattern dollar cost of $12 on linear scale 13.
   (c) Move longer index arm 16 with the shorter index arm 15 until index line 21 of the latter indicates profit "P" of $19 on scale 12.
   (d) Read selling price "S" of $190 at the point at which a spiral line of scale 14 is crossed by the 10% index of percentage scale 20. In other words, determine which spiral line crosses the hairline 22 at the 10% index mark on the percentage scale 22. In this case, the $190 spiral line.

Problem III

Given:
   Desired controllable profit "P"=$19
   Selling price "S"=$190
Required to find: Cost of item "C"
   (a) set longer index arm 16 on scale 14 so that 10% mark and index line 22 cross on $190 spiral line.
   (b) Set shorter index line 21 of arm 15 at $19 profit on scale 12.
   (c) Move longer index arm 16 together with shorter index arm 15 so that index of shorter arm reads $12 pattern dollar costs "F" on scale 13.
   (d) Read item cost "C" at $140 where index line on longer index arm crosses scale 12.

Problem IV

Given:
   Item cost "C"=$140
   Desirable controllable profit "P"=$0.00
Required to find: Break even selling price "S"
   (a) Set longer index arm 16 to read item cost "C" of $140 on scale 12.
   (b) Set shorter index arm 15 to read pattern dollar cost of $12 on scale 13.
   (c) Move longer index arm 16 with the shorter index arm 15 until the latter indicates a profit "P" of $0.00 on scale 12.
   (d) Read break even selling price of $169 (approximately) at the point at which the spiral line of the scale 14 is crossed by the 10% index of scale 20 and the index line 22.

Problem V

Given:
   Desired controllable profit "P"=$0.00
   Selling price "S"=$190
Required to find: Break even item cost "C"
   (a) Set longer arm 16 on scale 14 so that the 10% index of scale 20 intersects the $190 spiral line.
   (b) Set shorter arm 15 at $0.00 profit "P" on scale 12.
   (c) Move longer arm 16 simultaneously with shorter arm 15 until the shorter arm is set at $12 pattern cost "F" on scale 13.
   (d) Read item cost "C" at $159 where index line 22 of the longer arm 16 intersects scale 12.

It is believed from the foregoing that those familiar with the art will readily understand and appreciate the novel arrangement of the several scales appearing in the preferred embodiment illustrated. It is to be understood, of course, that while the slide rule calculator shown is manufactured for a specific range of dollars and percentage values, the principles and concepts involved are by no means so limited, the scale arrangement being useful in any given range of values related to particular selected circumstances. Therefore, while the invention has hereinabove been described as it appears in association with a preferred form of computer device, it will be understood and recognized that numerous changes, modifications, and substitutions of equivalents may be made in the computer device and in the size and scope of the scales without particularly departing from the novel arrangement of scales and their inventive combination. Consequently, it is not intended that the present invention be limited to the calculator embodiment illustrated and described, except as may appear in the following appended claims.

I claim:

1. In a computer, first and second graphically represented linear scales having matching graduations, said scales having a common zero index with their graduations reading in opposite directions therefrom, a pair of index arms with index hairlines movable independently over said scales, moving said arms to selected spacings between said index lines serving to add and subtract values of said two scales, a third scale comprising plural lines extending from graphic index values of said second scale and representing product values thereof, and linear index graduations on one of said arms cooperating with the said lines of said third scale in determining the difference between selected index values on said second scale and product values thereof represented by said third scale.

2. The combination as set forth in claim 1 in which said first and second scales are disposed in a circular pattern, said index arms pivot about the center of said circular pattern, and the lines of said third scale are generally curvilinear extending from said second scale toward said center, and means for maintaining selected angular spacings between the said index arms while moving the same simultaneously over said first and second scales.

3. In a computer, the combination of first and second linear scales having uniformly spaced and matching index graduations, said first and second scales having a common zero index with values increasing in opposite directions therefrom, a pair of index arms each having an index line and movable independently over said first and second scales, selected spacings between the index lines of said index arms serving to add and subtract values of said first and second scales, means for transferring said two arms simultaneously to selected positions on said second scale without disturbing the angular spacing therebetween thereby to determine the cumulative values between the index lines, a third scale comprising plural lines extending from the index marks of said second scale and representing product values for selected index values of said second scale, and a fourth scale comprising linear graduations on one of said index arms for cooperating with the lines of said third scale and the related index line of said one arm to determine the difference between said index values of said second scale and said product values thereof represented by the lines of the third scale.

4. In combination, a circular disc having a first scale adjacent its periphery and having graphic index points thereon, a second scale adjacent and overlapping said first scale and having an initial index common therewith, said two scales having matching graduations and reading in reverse directions from said initial index, plural curvilinear lines comprising a scale extending from the index markings of said second scale and spaced to correspond to selected value intervals on said second scale, and a pair of index arms each having an index line and commonly pivoted at the center of said disc, one of said arms carrying index graduations which cooperate with the curvilinear lines at predetermined points of intersection therewith to indicate the difference between values on said second scale and product values thereof indicated by the lines of the third scale and means providing for the movement of said index arms both simultaneously and independently of one another; the angular spacing between the index lines on said arms measuring cumulative values of said first and second scales which are readable on said second scale.

5. In a computer comprising a circular disc and a pair of index members commonly pivoted at the center of said disc, inner, outer and intermediate scales concentrically arranged with said center of the disc, at least the outer and intermediate scales of which are carried on the disc and have uniformly spaced and matching index graduations, said outer and intermediate scales having a common initial index with values increasing in opposite directions therefrom, the inner scale being graduated into a series of values corresponding to those values in which the intermediate scale is graduated and including radially extended curvilinear lines representing predetermined products of said corresponding values of the inner and intermediate scales, one of said index members having a radially extended indexing line alignable with graduations of said outer and intermediate scales, and the other index member having a radially extended graduated scale cooperating with said curvilinear lines, the one index member being movable with as well as independently of the other indexing member so as to be settable relative to said outer and intermediate scales of the disc and in accordance with a setting thereof in respect to said other indexing member.

References Cited in the file of this patent

UNITED STATES PATENTS

| 7,961 | Nystrom | Mar. 4, 1851 |
| 2,569,295 | De Witt | Sept. 25, 1951 |

OTHER REFERENCES

"Design of Special Slide Rules" (Jenkins), published in vol. 54, November and December 1917, and vol. 55, January 1918 of "Industrial Management." (Pages 244–245, vol. 54 relied on.)